May 25, 1965 N. E. PETERSON ETAL 3,185,963

SYNCHRONIZING SYSTEM HAVING REVERSIBLE COUNTER MEANS

Filed Nov. 25, 1960 6 Sheets-Sheet 1

INVENTORS
NORMAN E. PETERSON
AND ERNEST E. COURCHENE, JR.
BY
S.C. Yuter
ATTORNEY

SYNCHRONIZING SYSTEM HAVING REVERSIBLE COUNTER MEANS

Filed Nov. 25, 1960

*INVENTORS*
NORMAN E. PETERSON
AND ERNEST E. COURCHENE, JR.
*BY* S.C. Yuter
ATTORNEY

SYNCHRONIZING SYSTEM HAVING REVERSIBLE COUNTER MEANS

Filed Nov. 25, 1960

| C̄ | B̄ | Ā |
|---|---|---|
| 1 | 0 | 0 |
| 1 | 0 | 1 |
| 1 | 1 | 0 |
| 1 | 1 | 1 |
| 0 | 0 | 0 |
| 0 | 0 | 1 |
| 0 | 1 | 0 |
| 0 | 1 | 1 |

*INVENTORS*
NORMAN E. PETERSON
AND ERNEST E. COURCHENE, JR.
*BY*
S.E. Yuter
ATTORNEY INVENTORS
NORMAN E. PETERSON
AND ERNEST E. COURCHENE, JR.
BY
[signature]
ATTORNEY INVENTORS
NORMAN E. PETERSON
AND ERNEST E. COURCHENE, JR.
BY S.C. Yuter
ATTORNEY INVENTORS
NORMAN E. PETERSON
AND ERNEST E. COURCHENE, JR.
BY S.C. Yuter
ATTORNEY 3,185,963

SYNCHRONIZING SYSTEM HAVING REVERSIBLE COUNTER MEANS

Norman E. Peterson and Ernest E. Courchene, Jr., Fairfield County, Conn., assignors to Stelma, Inc., Stamford, Conn., a corporation of Connecticut Filed Nov. 25, 1960, Ser. No. 71,759
4 Claims. (Cl. 340—168)

This invention relates to a system for synchronizing two signal trains, and more particularly to a system for synchronizing a binary information signal with a local timing signal, in order to ensure accurate reading of the coded data carried by the information signal. The timing signal is then available for controlling associated equipment.

In communication media, information is frequently represented in binary form. That is, every bit of information will be in one of two states, respectively identified and referred to in the data processing arts as "1" and "0," and the telegraphy arts as MARK and SPACE. These two distinct states may be correspondingly represented by any two distinct electrical conditions within a selected category. One of the most common methods is to utilize the presence of a voltage to represent a "1" or MARK, and the absence of a voltage to represent a "0" or SPACE. Further, it is also possible to utilize any two respective distinct voltages (e.g. positive and negative voltages) to represent the two respective states.

In order that the data may be properly interpreted it is necessary to establish some fixed basis by which the individual data bits may be analyzed. This is generally done by assigning a predetermined interval of time to each binary bit, so that, ideally all of the bits will have identical pulse widths corresponding to equal or uniform time durations. Thus, in order to read such information, it is only necessary to inspect the data train at predetermined regular intervals to ascertain whether a"1" or "0" condition exists.

A common method of reading a coded signal train is to employ a short sampling pulse for each data bit. Such sampling pulse will serve to open or to close associated logical gating circuitry depending upon the state of the bit being sampled. However, when such signal information is transmitted any appreciable distance, the binary signals are susceptible to many possible types of distortion. The effect of distortion may be to randomly vary the pulse width or shape, or both, or the effect may be to introduce a constant distortional effect, e.g. the pulse widths of one state may be caused to be of a different length than the pulse widths of the other state.

The cumulative effect of the various types of distortion is to vary the widths of the different pulses, and, if the distortion is great enough, during a given interval, the sampling pulse may even be reading the wrong bit of information. To insure accuracy, therefore, it is desirable that the sampling occur precisely at the middle of a data pulse or bit so that substantial distortion would be required before incorrect reading would result.

One method of insuring that the sampling pulse will occur at the proper time, at the middle of a data pulse, is to generate a two-state timing signal having a frequency twice that of the data pulses, and to generate a sampling pulse each time the timing signal changes state in a predetermined direction. This change could be made to occur, theoretically, at the middle of each data pulse if the timing signal and the data signal were accurately phase synchronized. However, if for some reason the signals were out of synchronization during any given interval, then the sampling pulse, for that interval, would not be generated at the proper point in time. It is important therefore, that the timing signals be controlled to be synchronized with the data signals, so the timing signals can be relied on and used in associated equipment. Timing signals are usually generated locally at a receiving station. It is therefore necessary to synchronize them initially with the incoming data signals, and then to maintain synchronization.

Accordingly one object of this invention is to provide an improved all digit system for synchronizing two pulse-type signal trains.

Another object is to provide a system which will maintain two signal trains in synchronization regardless of any pulse variations in one of the trains.

Still another object is to provide a digital synchronizing system that will examine two signals over a predetermined period of time, and correct only if a predetermined lack of synchronization exists throughout that period.

A further object of the invention is to provide improved means for assuring a more accurate interpretation of binary information.

A still further object of this invention is to provide a data receiving system which is capable of compensating for the detrimental effects of distortion introduced in the transmission medium.

A further object of the invention is to provide an improved reversible counter suitable for general application.

A further object of the invention is to provide an improved reversible digital counter for use as a digital integrator or accumulator to obtain a digital measure of the duration of non-synchronization or phase displacement between two signal pulse trains that are to be related, and to use such digital measure to eliminate the displacement and to establish synchronization.

This improved reversible counter is illustrated herein as provided with three bistable multivibrator sections, to set up a digital output count according to the states in the three sections. The counter is here used to detect a non-synchronized condition between the signal pulse train and the timing pulse train.

In accordance with the invention, the system includes means for generating trains of clock pulses, with means for generating a local timing signal from a predetermined number of the clock pulses, and a reversible counter for comparing the timing signals with the incoming information signals. If the timing signals are "late" with respect to the incoming information signal, the reversible counter counts backwards. Upon the accumulation of a predetermined count in either direction, indicating a continuing condition of the timing signals being "late," or "early," relative to the incoming information signal, the transfer of the clock pulses to the timing signal generator is modified by increasing or by decreasing the number of clock pulses to the timing signal generator within a regular time interval during which correction is required. In this manner, one timing signal is shortened or lengthened, as need be, and the subsequent train of timing signals is advanced or retarded. Depending upon the count in the reversible counter, such action may be continued until those timing signals are progressively shifted to be properly synchronized with the incoming information signals.

The digital reversible counter constitutes an important feature of this invention. It comprises a plurality of stages of bistable multivibrators, here shown as three stages, with diode steering of an incoming trigger pulse to the first stage, and diode steering of output pulses from each stage before the last, here first and second, to each succeeding stage, to establish digital counting.

The incoming trigger pulse is time-derived from the incoming signal pulse code train, and is steered according to the state of the first stage so as to effect a change of state in that first stage. The change of state of the two elements of that first stage bistable provides two output pulses of opposite polarity. The output pulse of each polarity is separately directed by a pair of steering diodes to the inputs of the next stage, depending upon the bias on the respective pairs of diodes. That bias on each pair of the coupling diodes between stages is here controlled according to the respective contemporaneous polarity of each timing pulse from the generator.

Thus the input information signal pulse generates the two bistable output pulses from the first stages of the reversible counter. Those two pulses are available to be steered by the interstage diodes according to the polarity bias on those diodes by the timing signal polarities. This provides the measure or detection of timing or synchronized relation between input signal pulse and local timing pulse. Here the "early" or "late" relationship is ascertained, and the appropriate diode passes the interstage pulse, or not, to the next stage.

By reversing the bias on each pair of interstage steering diodes it has been found possible to achieve effective forward and reverse counting control in a chain of bistable multivibrators.

The digital reversible counter provides a digital count to control suitable gates, either to add an auxiliary clock pulse to the regular clock pulse train supplied to the timing pulse generator in order to accelerate and shorten a selected timing pulse, or alternatively, to inhibit and block out one regulator clock pulse from the pulse train to the timing pulse generator to require an additional clock pulse to form the timing pulse. In that latter event, that corrected timing pulse is extended and delayed. In the first or accelerated case, the subsequent train of timing pulses is advanced. In the second case, the subsequent train of timing pulses is retarded, relative to the incoming information signal pulses, until synchronization is established, or re-established where a transient condition has disturbed a synchronizer relationship.

The manner in which the synchronizing system works, including the improved reversible counter, is described in the following specification, taken in connection with the accompanying drawings, in which.

Figure 2:
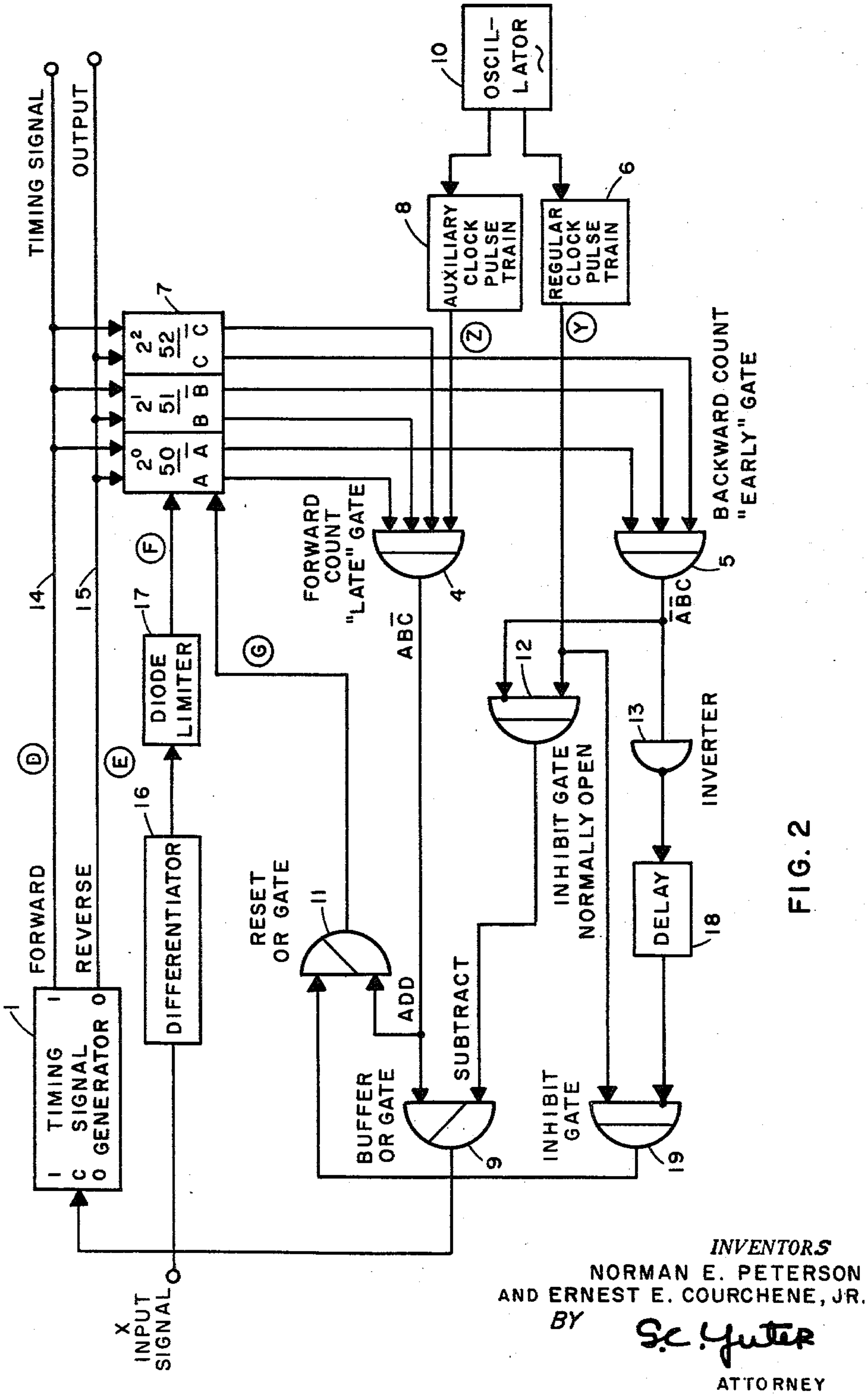
FIGURE 2 is a more detailed block diagram of the system.
Figure 6:
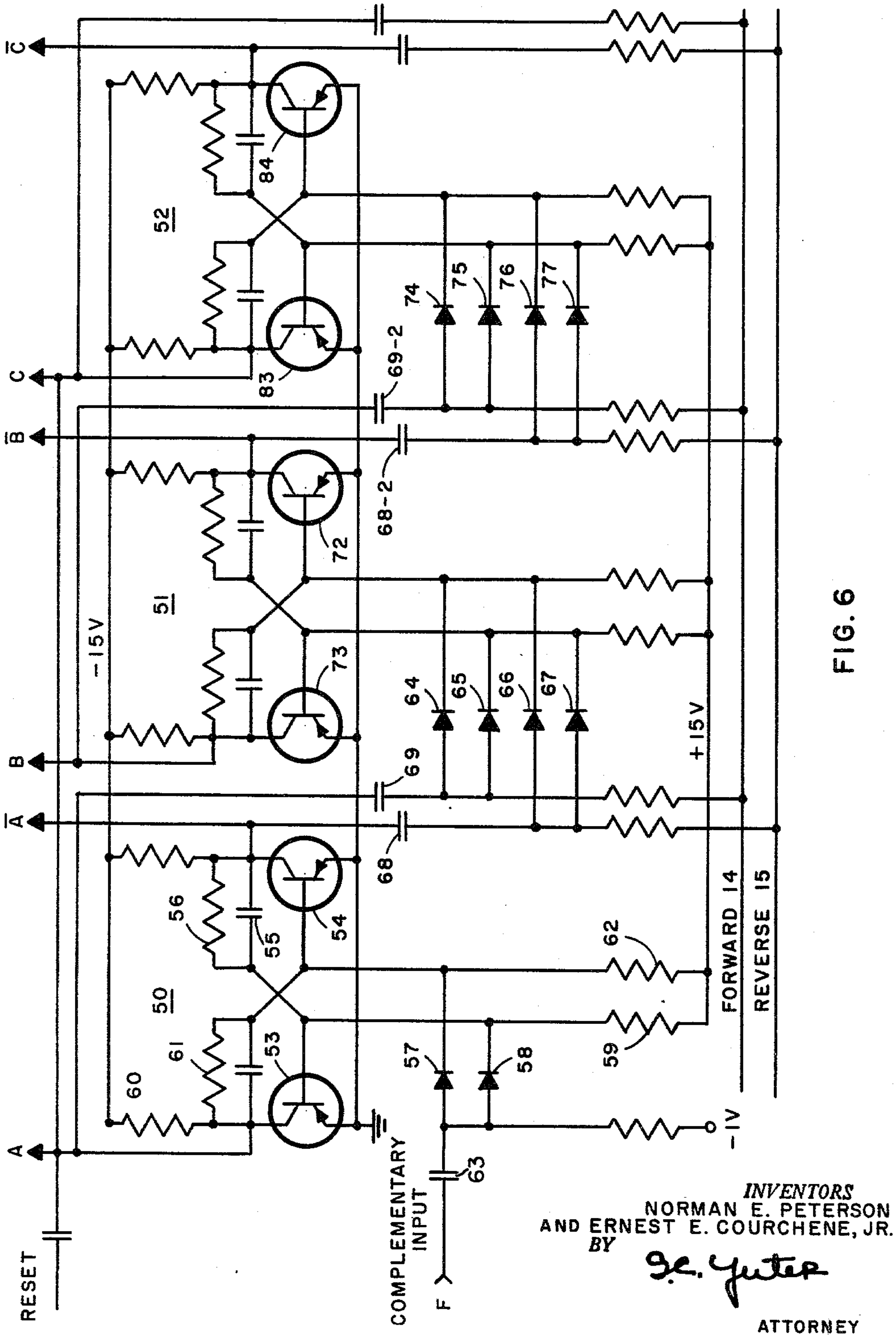

FIGURES *5a* and *5b* are simple diagrams of an AND gate, and of a delay and inverter used in the system in FIGURE 2;

FIGURE 6 is a diagram of the improved reversible counter constituting an important feature of this invention;

FIGURES *7a* and *7b* are time charts showing the timing of related operations of the system.

For purposes of illustration, an incoming information signal will be assumed in which a "0" or SPACE signal is represented by a zero voltage or ground, and a "1" or MARK signal is represented by a negative voltage. For purposes of explanation it will be assumed that an incoming signal X having an information waveform 101010, as shown in the top line X of FIGURES *7a* and *7b*, is being received from some outside source.

Figure 1:
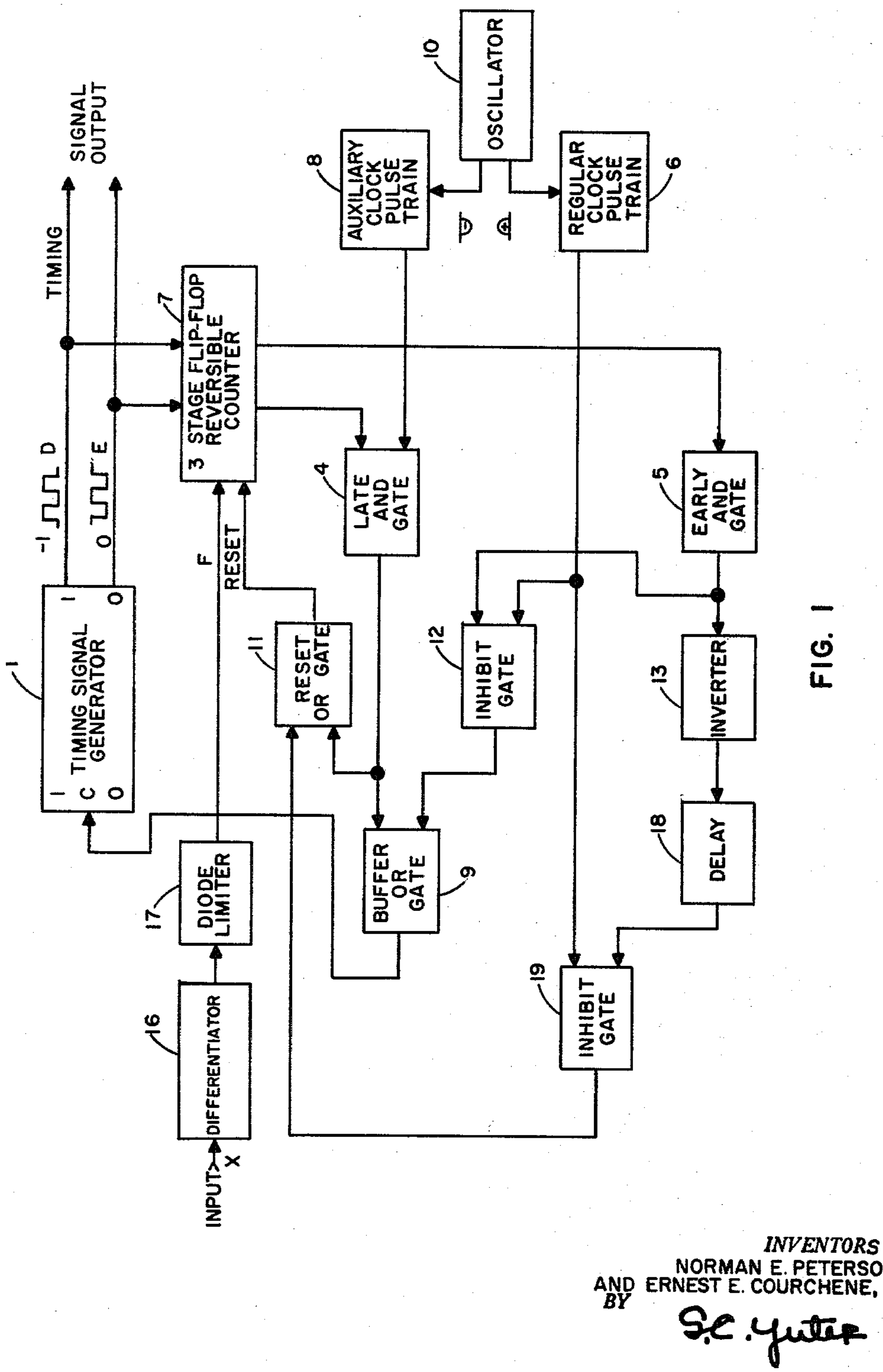
FIGURE 1 is a functional block diagram of the system of the invention.

FIGURE 1 shows the generalized arrangement of the system.

An incoming signal X is differentiated at 16 and clipped by a diode limiter 17 to derive positive spike pulses only at the leading edge of MARK signal pulses in the signal train X. The negative parts of the differentiated pulses are removed by the diode limiter 17. Those positive spike pulses are then fed as a pulse F, line F of FIGURES *7a* and *7b*, to a reversible digital counter 7 which is to compare the incoming signal pulses with pulses of a timing signal to detect those differences or non-synchronized conditions and then to initiate corrections.

A pulse clock consisting of an oscillator 10 and two monostable multivibrators 6 and 8, hereinafter referred to as monostables, provides a regular train of pulses through monostable 6 (line Y FIGS. *7a* and *7b*), and an auxiliary train through monostable 8 (line Z FIGS. *7a* and *7b*). The regulator train from 6 is fed to a frequency divider or counter with three stages, to serve as a timing signal generator 1 using both outputs from the third stage to provide two timing signals of opposite phase as represented in lines D and E of FIGURES *7a* and *7b*, to control the direction of count in the reversible counter 7.

Four pulses, normally from monostable 6, will generate one timing pulse from timing signal generator 1. By inserting an auxiliary fourth pulse from monostable 8 before the regular fourth pulse from monostable 6, the one timing signal pulse thus effected in generator 1 can be shortened. Symmetrical triggering is used so each pulse assures change of state.

Therefore, if the timing signal is late relative to the incoming signal X, as in FIG. *7a*, reversible counter 7 detects the late condition, and if that condition exists for time enough to reach a predetermined count, late gate 4 sends an auxiliary pulse from 8 through OR gate 9 to the timing generator 1, and a reset pulse through reset gate 11 to immediately reset the reversible counter 7 to initial position for a new counting start.

If the timing signal is early, the reversible counter 7, after a predetermined count, enables early gate 5 to close inhibit gate 12 to suppress one regular clock pulse from 6 normally going to the timing signal generator 1 through OR gate 9. Gate 5 output, delayed at 13 and 18, enables inhibit gate 19 to transmit a reset pulse through reset gate 11 to reversible counter 7. That delayed reset pulse is available from monostable 6 but is normally inhibited at gate 19 until early gate 5 operates to remove inhibit at gate 12.

Thus, if the local timing signal is late, the reversible counter causes an expediated auxiliary clock pulse to be fed into timing signal generator 1 to advance the timing signal. If the timing signal is early, one regular clock pulse is suppressed so the next later clock pulse is needed to complete the formation of the corrected timing signal pulse. With each such operation, the reversible counter is reset to initial position to restore any error or phase-displacement count.

The manner in which the timing pulse signals are generated and synchronized with the incoming information pulses will now be more specifically explained with reference to FIG. 2. A crystal oscillator 10 is adapted to energize a monostable multivibrator 6 so as to generate a continuous stream of Y clock pulses as shown in the second line of FIGURES *7a* and *7b*. The output of monostable 6 is adjusted to produce an even number of clock pulses, eight in this case, for each binary incoming information pulse.

The pulses from monostable 6 are passed through normally open AND gate 12 and OR gate 9 to the timing signal generator 1, as in FIG. 1, which consists simply of a frequency dividing counter. The timing signal generator 1, in the illustrated embodiment, is a binary counter comprising three bistable flip-flops. In a three-stage counter the last stage or flip-flop will change state upon the appearance of every fourth pulse at the counter input. Therefore after the application of a group of four Y clock pulses into timing signal generator 1, an output pulse may be derived from generator 1 which will normally have a pulse width of one half the ideal width of an information pulse, as shown at D in FIG. *7a*, since as stated above, the monostable 6 produces eight pulses for each binary incoming information pulse. It should be noted that these timing pulses in generator 1 are generated independently of the actual incoming information pulses. For the purpose of the present invention, both the "0," and the "1," outputs from the timing signal generator 1 are used.

Since the output timing pulse signals are generated by the gerenator 1 in response to a predetermined number of input clock pulses, it can be seen that by changing the timing of the input pulses to the generator, the width of the output timing pulses can be changed. More specifically, generator 1 normally generates an output timing pulse upon the appearance of every fourth Y clock pulse coming from the output of monostable 6. If one of these four clock pulses were not permitted to reach the generator input, generator 1 would not change state until an actual fifth clock pulse from the output of monostable 6 would be passed to the input of generator 1. In this manner the last stage of timing signal generator 1 would remain in one state for a longer period than normal and the width of that single output timing pulse would therefore be increased.

Similarly, if an additional auxiliary clock pulse were inserted into the generator 1 prior to the appearance of four regular Y clock pulses from the output of monostable 6, the last stage of generator 1 would change state before the receipt of the regular fourth Y clock pulse. In that case, the width of that hurried individual timing pulse from generator 1 output would be decreased.

Theoretically, it would be possible to change the width of only the first timing pulse by the appropriate amount to synchronize the two signals. For example, with reference to FIGURE 7*a*, the first pulse of the timing signal in line D is shown occurring *t* milliseconds "late" with respect to the information signal X in the first line. If the first timing pulse were simply shortened by *t* milliseconds and the remaining pulses left unchanged, the two pulse trains should be in perfect synchronization. Likewise if the timing signals were *t* milliseconds early, as shown in FIGURE 7*b*, it should be necessary merely to increase the width of the first timing pulse by *t* milliseconds to synchronize the two signal trains.

However, as a practical matter, the effects of distortion during transmisson will cause almost any two signal pulses, compared alone, to appear to be slightly out of synchronization even though the two signal trains, as such, are as closely synchronized as possible. Therefore a device is needed which will compare a plurality of signal pulses in one train with a plurality of signal pulses in the other train, and compensate or correct only when a lack of synchronization appears consistently throughout a given period of time. In effect, then, the comparing and corresponding device must act as an integrator, algebraically adding the early and the late out-of-phase indications so that correction will occur only when a determination has been made that throughout a given interval of time the timing signals have been occurring early or late with respect to the information signals.

A reversible counter 7 indicated in FIGURE 2, operates as such an integrator. This counter 7 embodies one of the major inventions herein, and is shown in detail in FIGURE 6. It consists basically of three bistable stages 50, 51 and 52 with circuitry to achieve the forward and reverse types of counting operations, as will be explained below. In passing, it may be mentioned again that this reversible counter is an important feature itself in the overall system.

Figure 7A:
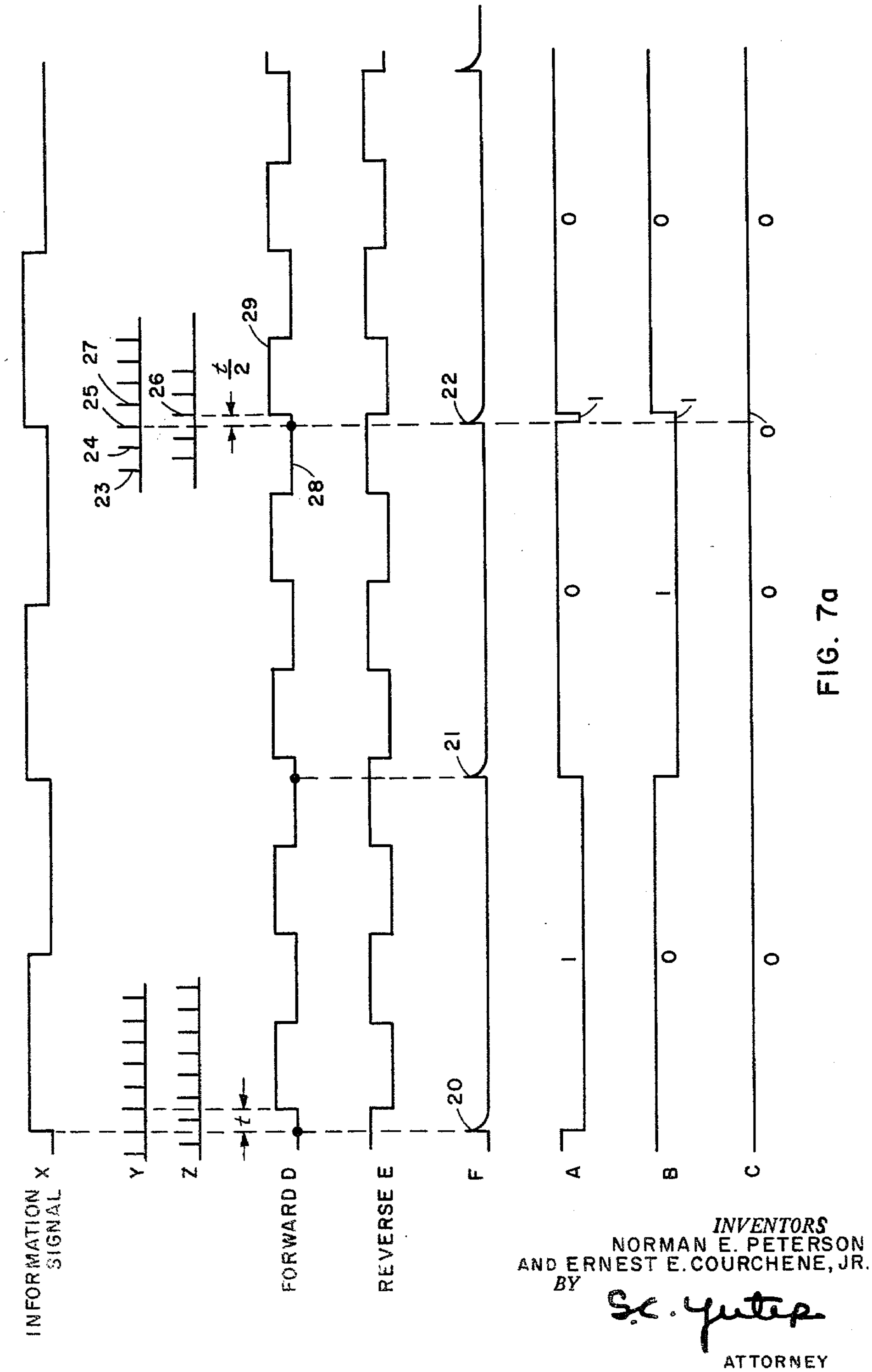
Figure 7B:
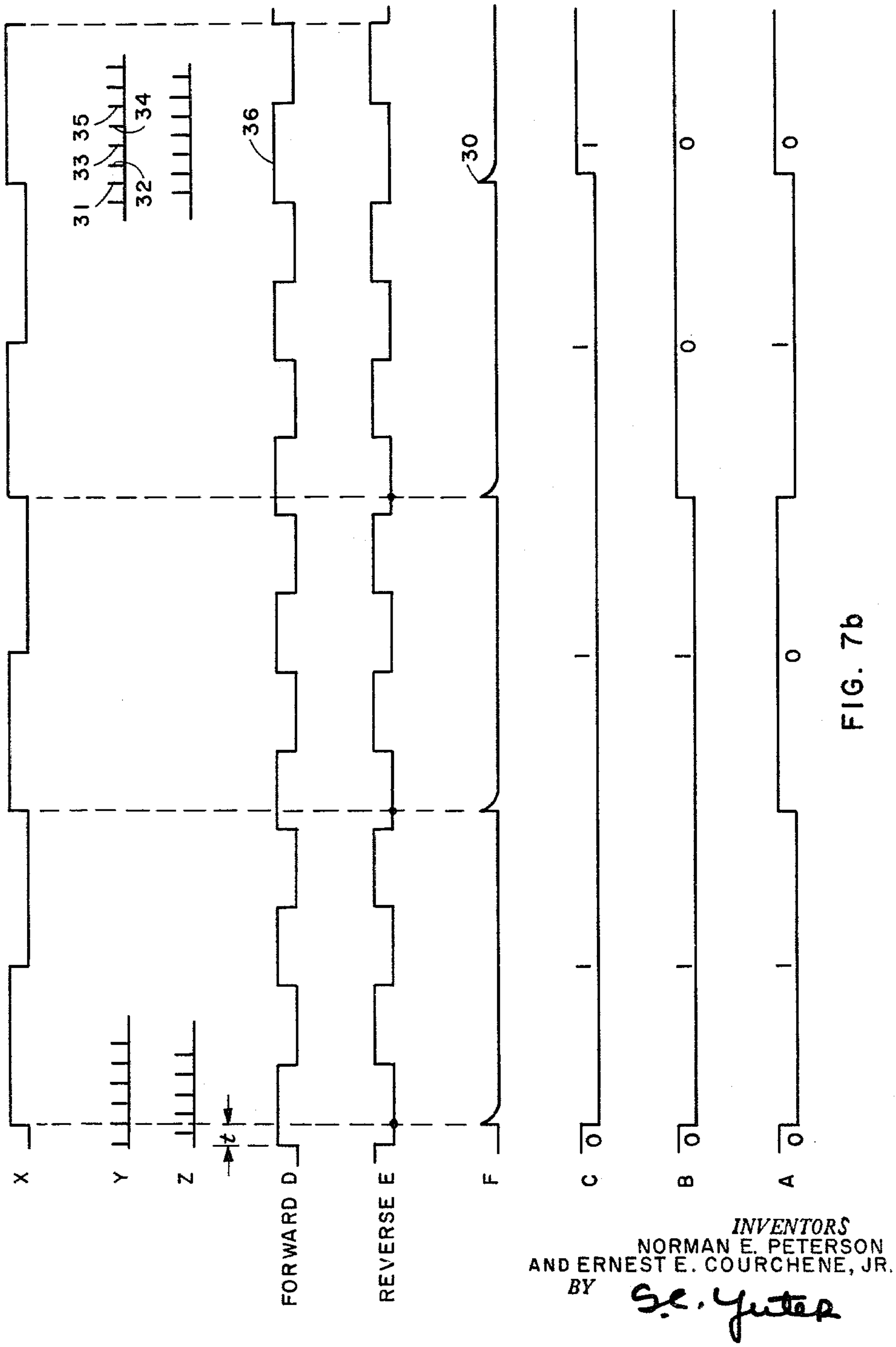

The counter 7 is supplied with positive spike pulses, shown in FIGS. 7*a* and 7*b*, as derived by differentiation of the "1 going" or leading edge of MARK only of information signal X and clipped by diode limiter or clipper 17 to remove the negative part of the differentiated pulse. In operation, if a negative voltage appears on line 14 from timing signal generator or Generator Counter 1 indicating the timing signals are "late," counter 7 counts in a forward direction, and if a negative voltage appears on line 15 from Generator 1 to Integrator Counter (also referred to as reversible counter) 7, indicating the timing signals are "early," counter 7 will count in a reverse direction. When counting in a forward direction a digit "1" is added to the stored count, and when counting in reverse the digit "1" is subtracted. The operation of reversible counter 7 is more particularly described below with reference to FIGURE 6. It should also be noted that the voltage on line 15 is derived from the complementary output of the last stage of timing signal generator 1, and is therefore the inversion of the timing signal which appears on line 14. The output timing pulse signal from Generator 1 onto line 14 is shown at D in FIGS. 7*a* and 7*b*; the output timing pulses onto line 15 are shown at line E, of FIGS. 7*a* and 7*b*.

Thus, there is present at all times a negative voltage on either line 14 or line 15, which is determinative of the direction in which the counter 7 will be caused to count in response to the input information pulses F (FIG. 7*a*). When the information signal appears at the input, a differentiator 16 and a clipper 17 are operative in well known manner to derive pulses representative of transitions, from "0" to "1" or from SPACE to MARK to the input of reversible counter 7. Differentiator 16 may be a common RC circuit and clipper 17 a properly poled diode.

In FIGURE 7*a* waveforms are shown for the condition existing when the timing signal D is "late" with respect to the information signal X in top line. In that case, the transition pulses F will occur when the voltage on line 14 is at a negative value and the voltage on line 15 is at ground. Reversible counter 7, in response to the transition pulses, will therefore count in a forward direction whenever the timing signals are "late," as will be shown in FIGURE 6.

Referring to FIGURE 7*b*, in which waveforms are shown for the condition existing when the timing is "early" with respect to the information, it can be seen that the transition pulses occur when the voltage on line 15 is negative and the voltage on line 14 is at ground. In this case reversible counter 7 will count the input pulses in a backward direction.

Figures 3, 4, 5A, 5B:
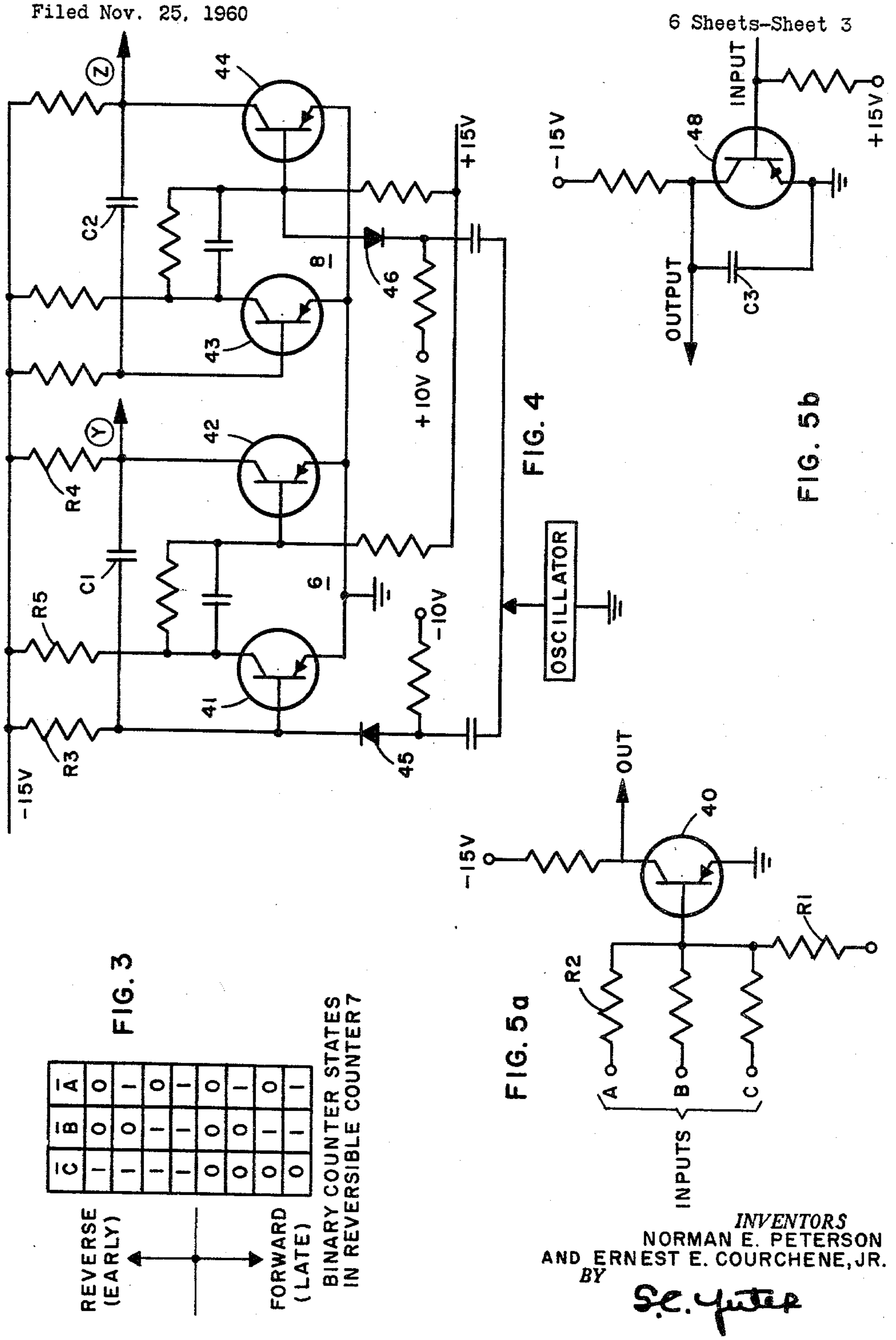
FIGURE 3 is a chart of binary numbers related to the three stages of the reversible counter.
FIGURE 4 is a diagram of the clock pulse train generator.

At this point reference is made to FIGURE 3 in which a chart is shown illustrative of the possible states of the three stages, A, B and C, of reversible counter 7. In a reset condition all three stages are in a "0" state. The maximum permitted forward count is thus to 011 requiring there input pulses and the maximum permitted count in the reverse direction is to 100 requiring 4 input pulses. Any count in either direction in excess of these maximum counts would result in ambiguity, making it impossible to recognize by the state of the counter whether the timing signals are "early" or "late." Thus, for a forward count, indicating timing signals are "late," the last stage is always 0, and for a reverse count, indicating the timing signals are "early," the last stage is always 1.

In FIGURE 2, AND gate 4 is adapted to recognize a maximum forward count stored in reversible counter 7, and AND gate 5 is adapted to recognize a maximum reverse count. The fourth input to gate 4 is derived from a monostable 8 which is adapted to generate the Z train of auxiliary clock pulses in the same manner as monostable 6 but occurring 180 degrees later, as shown in line Z of FIGURES 7*a* and 7*b*. Thus, when the maximum forward count is recognized, by gate 4, indicating that timing signals are "late," gate 4 is enabled by monostable 8 to apply a pulse through OR gate 9 to the input of timing signal generator 1. In this manner an additional clock pulse is applied to generator 1 prior to the receipt of a regular fourth Y clock pulse from monostable 6, whenever the maximum forward count, due to "late" timing signals is stored in reversible counter 7. The pulse from gate 4 is here also applied through an OR gate 11 to reset the reversible counter 7 to its original state.

When gate 5 recognizes a maximum reverse count in reversible counter 7 indicating that the timing signals are "early," gate 5 passes a pulse to the inhibiting input of gate 12 to prevent the passage of an immediately subsequent clock pulse from monostable 6 to the timing signal generator 1. In this manner a pulse is effectively subtracted from the input of timing signal generator 1. To reset the reversible counter 7 the output of gate 5 is inverted by inverter 13 and delayed by delay unit 18, in order to open AND gate 19 and pass a pulse from monostable 6 through gates 19 and 11 to the reset input of reversible counter 7. The delay is necessary to insure that gate 5 will not be closed until after it has blocked one clock pulse from monostable 6 at inhibitor gate 12.

Thus, it can be seen that whenever the reversible counter 7 reaches a maximum count in the forward direction, indicating the timing signals pulses are "late," a clock pulse from Z auxiliary or correction train from monostable 8 is added to the regular train of Y pulses being supplied to the timing signal generator 1 from the regular timing pulse source, the monostable 6. Inversely, when the counter 7 reaches the maximum count in the reverse direction, indicating the timing signal pulses are "early," a clock pulse is extracted or inhibited from the regular Y train by the inhibitor gate 12. The manner in which this action will tend to synchronize the timing and information will now be described with reference to the specific waveforms of FIGURES 7*a* and 7*b*.

As previously mentioned, FIGURE 7*a* illustrates the waveforms existing when the local timing signal on line D occurs *t* milliseconds "late" with respect to the information signal X. Normally, each timing signal is generated by generator 1 upon the receipt of four regular Y clock pulses from monostable 6. In this case, the information transition input pulses in line F appear at the input of reversible counter 7 when the timing signal D, which appears on conductor 14, is negative. Reversible counter 7 is thus enabled to count in the forward direction. Upon the receipt of the first transition input pulse 20, the counter 7 stepped to the 001 state, measured at the "0" outputs of the three stages, to be described in FIGURE 6. If the second transition pulse 21 occurs when the voltage on forward line 14 is negative (indicating that the timing pulses are still "late") the counter 7 will be stepped to the next binary number or 010. Similarly the third transition pulse 22, occurring when the timing signals are still "late," will step the counter to its maximum forward count or 011. Gate 4 will now be enabled and the clock signals Z which were normally blocked can now pass through gate 4 to timing signal generator 1. However, as soon as the first Z clock pulse 26, line Z of FIG. 7*a*, passes through gate 4 that Z pulse is also passed through OR gate 11 to the reset input of counter 7, which when reset will remove the enabling inputs from gate 4, blocking the passage of any further Z pulses after pulse 26 to the timing signal generator 1. Normally Y pulses 23, 24, 25 and 27, line Y of FIGURE 7*a*, would be the four clock pulses serving to generate timing pulse 28, line D. However, after pulses 23, 24, and 25 are received by the timing signal generator 1, the Z pulse is applied to the generator input as the fourth clock pulse, causing timing pulse 28 to be formed as a shortened pulse before the receipt of Y pulse 27. Timing pulse 28 is therefore shortened by a half time interval between Y pulses from monostable 6. Y pulse 27 when received will therefore be counted as the first clock pulse of the next group of four for establishing the succeeding timing pulse 29. The timing signal generator 1 continues to count the Y clock pulses in the normal manner to generate successive timing signals. However, because of the insertion of the Z clock pulse 26 into the Timing Signal Generator, as just explained, pulses 28 and 29 have each been shortened by an amount equal to one half the interval between the clock pulses, which will cause all the succeeding timing pulses D to be generated a corresponding time interval earlier or closer to in phase with the information signal.

In FIGURE 7*b* the timing pulses are shown occurring *t* milliseconds "early." The operation of the device under this condition is analogous to the preceding description. In this condition, the transition input pulses F to reversible counter 7 will occur when the voltage on the reverse line 15 is negative, and accordingly the counter will count these pulses in a reverse direction. Upon receipt of the fourth transition pulse 30, the reversible counter will be stepped to its maximum reverse count 100. This count will open gate 5, which will place an enabling signal on the inhibit input of gate 12, i.e. gate 12 will be closed. The closing of gate 12 will prevent the passage of Y clock pulse 31 to the input of Timing Signal Generator 1. Thus timing pulse 36, which would normally be generated upon receipt of the four Y clock pulses 31, 32, 33 and 34, is now generated by Y pulses 32, 33, 34 and 35. In this manner the length or duration of timing pulse 36 is increased by delaying the trailing edge by an amount equal to one clock pulse interval which will cause the succeeding timing pulses to be delayed and placed closer to in phase with the information input bit signals.

The output of gate 5 is inverted by an inverter 13, delayed by delay device 18, and then applied to suppress an inhibit input of gate 19 to permit the next regular Y clock pulse to go through to apply a delayed reset pulse, Y pulse 7, in FIGURE 7*b*, through OR gate 11 to reversible counter 7 to set the counter 7 to its initial state 000.

In many cases the addition or subtraction of a single clock pulse will not adequately synchronize the two signals. If, after one compensatory operation, the signals are still not properly synchronized, the above described operation will simply be repeated until the signals are adequately synchronized. Once the two signal trains are properly synchronized, and the absence of abnormal disturbing occurrences, the receipt of successive transition pulses at the input of reversible counter 7 will step the counter first in one direction and then in the other. Under normal conditions, the reversible counter will not reach either of its maximum counts requiring the enabling of either gate 4 or 5.

The invention is not limited to the illustrated embodiment, which was chosen only for purpose of description. In this embodiment it is noted that each compensatory operation shifts the timing signals by an amount of time equal to ⅛ (or 12½ percent) of a normal timing pulse cycle. As a practical matter it is generally desirable to shift the timing wave by a much smaller percentage. In such a case it is only necessary to increase the rate of the clock pulses Y and Z, and to increase the scale of Timing Signal Generator 1. For example monostables 6 and 8 may generate 128 clock pulses per information pulse and the Timing Signal Generator may be a seven stage counter capable of generating one timing pulse upon the receipt of 64 clock pulses. In such a case the operation of the circuit would be identical to that described, but each time a correction was made it would shift the timing wave by only $\frac{1}{128}$ or less than 1% of a timing pulse cycle.

Furthermore if it is desirable to examine the two waves or average the out-of-phase indications over a longer period of time, the bit length of reversible counter 7 may be increased by adding stages of any desired amount. For example if a fourth stage D were added to the three stages A, B and C of counter 7, the maximum forward count would be 0111 or seven and the maximum reverse count would be 1000 or eight. In other words eight "late" counts or seven "early" counts would be required before a correction would be initiated. Of course the inputs to gates 4 and 5 would have to be also changed to recognize such new maximum counts.

Thus by varying the length or number of stages of reversible counter 7, the number of phase errors or tolerance which will be permitted before initiating correction may be controlled, and by varying the length or scale of division of the Timing Signal Generator Counter 1 the amount or increment of each such correction may be controlled. These parameters, of course, will be determined by the basic requirements of the system in which the invention is to be employed.

It should also be obvious that any equivalent type of logic circuits may be employed in the invention. For example, in one particular embodiment (not shown) all of the gating circuits illustrated in FIGURE 2 were NOR gates. A NOR gate is a gate from which there is an output only when there is no signal on any of the input lines. In the particular circuitry employed this means that when all the inputs of a gate are at ground the output is at −15 volts, and if any of the inputs are at −15 volts the output is at ground.

Referring now to FIGURE 4, the manner in which the clock pulses for FIGURE 2 are generated, will now be described. Monostables 6 and 8 are common and well known in the electronic arts. In operation, transistors 41 and 43 conduct because of the negative bias on their bases. Transistors 42 and 44, in the stable state, are cut-off and so their collector voltages (the outputs) will normally be at −15 volts. Oscillator 10 is a common crystal oscillator whose output is a sinusoidal wave. A positive voltage excursion of the oscillator output exceeding the negative bias of 10 volts on diode 45 will be passed by diode 45, which is forward directed but will be prevented by diode 46 from reaching the input to monostable 8. The positive voltage excursions therefore will be applied only to the base of transistor 41 to drive monostable 6 into its unstable state by causing transistor 41 to become non-conducting, and its collector negative through resistor R5. The negative voltage thus appearing at the collector of transistor 41 is applied to the base of transistor 42 causing transistor 42 to conduct and bringing its collector voltage to ground. The change in potential at the collector of transistor 42 charges capacitor C1, which then discharges through resistor R3, biasing transistor 41 again into conduction, which back biases transistor 24 into non-conduction. The monostable 6 will remain thus in its stable state, 41 conductive and 42 non-conductive, until the appearance of the next positive voltage excursion from oscillator 10.

A negative voltage excursion of oscillator 3 operates on monostable 8. Such negative excursion will be blocked by diode 45 but will be passed to transistor 44 if such voltage excursion exceeds the +10 volt reverse bias shown on diode 46. A negative pulse on the base of transistor 44 biases this transistor into conduction (the unstable state) raising its collector voltage from −15 volts to ground. This charges capacitor C2. The unstable state exists until capacitor C2 discharges through resistor R4, returning the monostable 8 to its stable condition. By adjusting the time constants of monostables 6 and 8, (R3) (C1) and (R4) (C2) respectively, the width of the clock pulses, as outputs from transistors 42 and 44, may be varied.

A schematic diagram of common NOR (or AND) gate is shown in FIGURE 5*a*. Transistor 40 is a PNP transistor which is normally biased off by a +15 volt potential applied to its base. When non-conducting, the collector or output voltage of transistor 40 is at the biasing potential on the collector (−15 volts). If a −15 volt pulse is applied to, for example, input A, the base of transistor 40 will be driven negative by the voltage dividing resistors R1 and R2. When the base of transistor 40 is driven below the emitter potential, the transistor conducts, bringing the output collector voltage to the emitter voltage or ground. Similarly if negative pulses are applied to any combination of the inputs A, B and C, the output voltage will be at ground. Thus there will be a negative output voltage only if all the inputs are grounded.

FIGURE 5*b* illustrates a circuit which may be utilized both for the Inverter 13 and for the Delay 18, shown in FIGURE 2. With no input on the base of transistor 48, the transistor is biased off by the +15 volts bias, and the −15 volt collector potential will appear on the output. The application of a negative pulse to the base will cause conduction to commence tending to raise the collector voltage to ground. However, since capacitor C3 is tied from the collector to ground, and since the potential across a capacitor can not change instantaneously, there is a slight delay before the collector voltage actually reaches ground.

In employing this type of NOR logic every one of the illustrated gates could be a NOR gate. Also, herein, the "1" state of a counter stage would be indicated by a ground voltage on the "1" output of that stage and by a negative voltage on the "0" output. The outputs of gates 4 and 5 of FIGURE 2 would normally be at ground. Gate 12 would normally be closed but would be opened when a ground pulse was applied to its input by monostable 6. The output of gate 9 would normally be negative but would go to ground when a negative voltage was applied to one of its inputs. Thus, in normal operation, every time a positive going pulse was generated by monostable 6, a positive going pulse would be applied to generator 1.

If gate 5 were enabled to pass a negative pulse to gate 12, the output of gate 12 would remain at ground and the output of gate 9 would remain negative. Under such circumstances no positive going voltage could be applied to generator 1. If gate 4 were enabled by a ground pulse from monostable 8 a negative pulse would be applied to the ADD input of gate 9 driving the output of gate 9 to ground and coupling a positive going pulse to the input of generator 1. When both of the inputs of gate 19 are at ground or when the output of gate 4 is at a negative voltage, the output of gate 11 will be at ground. If this ground voltage is applied to all of the "1" outputs of reversible counter 7, each of the stages will be in the "1" condition and AND gates 4 and 5 will both be closed.

In effect then the exclusive use of NOR gates would be fully equivalent to the use of AND gates 4 and 5, inhibiting AND gates 12 and 19, and OR gates 9 and 11. There are many types of logic circuits and combinations of these circuits which may be employed within the spirit of the invention.

Referring now to FIG. 6, there is shown the improved reversible counter, which is a major feature of this invention. Each of the three stages 50, 51 and 52 consists of a well known bistable transistor multivibrator of flip-flop. Since the three flip-flops operate in identical manner only one need be explained. Flip-flop 50 includes two PNP transistors 53 and 54. It should be noted that although PNP transistors are shown in the illustrated embodiment, NPN transistors with appropriate circuit changes or vacuum tubes or any other equivalent circuitry would be equally applicable. The flip-flop is in its "0" state when transistor 54 is conducting and transistor 53 is non-conducting. In this state, the "0" output $\overline{A}$ at the collector of transistor 54 will be at ground and the "1" output $\overline{A}$ at 53 collector will be at a voltage in the vicinity of the negative collector bus voltage. If a positive voltage is now applied to the base of transistor 54 transistor 54 will be back biased, since it is a PNP transistor, and conduction through the transistor 54 will cease. When conduction stops in 54, the voltage at the collector of transistor 54 moves from ground toward the collector bus potential of −15 volts, and this drop in voltage is coupled through RC circuit 55 and 56 to the base of transistor 53. The negative voltage at the base of transistor 53 causes transistor 53 to become conducting thereby raising its collector voltage, output A, to ground. The flip-flop will remain in this state until a positive pulse is applied to the base of transistor 53 causing transistor 53 to become non-conducting and transistor 54 to become conducting.

In summary, then, the application of a positive input pulse to the input of transistor 54 causes the "1" output A of 53 to go to ground, and the "0" output $\overline{A}$ to go to a high negative voltage, while the application of positive input pulse to the input of transistor 53 causes the "0" output $\overline{A}$ to go to ground and the "1" output at A to go to a high negative voltage.

It is also desirable for symmetrical switching to supply a bistable multivibrator with a complementary or "c" input, to which the application of a pulse will cause the multivibrator to switch states. This may be done by the use of diodes 57 and 58 in the following manner. Assume that flip-flop 50 is in its "0" state, i.e., the voltage at the collector of transistor 54 is at ground and the voltage at the collector of transistor 53 is at a negative value. Resistors 56 and 59 will comprise a voltage divider between the +15 biasing bus voltage and ground at the collector of transistor 54, causing a positive voltage to appear on the cathode of diode 58 to back bias the diode. At the same time, resistors 60, 61 and 62 will comprise a voltage dividing network between the +15 volt and the −15 volt busses. Resistor 62 is made larger than the combined value of resistors 60 and 61, and the voltage drop across resistor 62 will therefore be greater than 15 volts and will cause a negative voltage to appear on the cathode of diode 57 as a forward bias. If a positive going pulse is now applied to the complementary "c" input, a positive "spike" is developed across input capacitor 63 and passed through only the forward biased diode 57 to the base of transistor 54. Transistor 54 will then stop conducting and thus switch the flip-flop to its "1" state in the manner described above. In a similar manner when the flip-flop is in the "1" state, diode 58 will be forward biased and diode 57 will be reverse biased, so that when a positive going pulse is applied to the complementary or "c" input, a positive "spike" will be steered to the base of transistor 53, the "c" input through diode 58 causing the flip-flop to change state.

This selective principle is herein modified so it may be utilized to control a chain of flip-flops to provide a reversible binary counter, by selectively applying either the "1" or the "0" output of one flip-flop to the complementary "c" input of a succeeding flip-flop with the concurrent application of a suitable bias depending upon the direction in which the counter is desired to count.

Continuing with FIGURE 6, diodes 64 and 65 are connected between the "1" or A output of the first stage flip-flop 50 and the "1" and the "0" outputs, respectively, of the second stage of flip-flop 51. Similarly, diodes 66 and 67 are connected between the "0" or $\overline{A}$ output of first stage flip-flop 50 and the "1" and the "0" inputs, respectively, of second stage flip-flop 51. Assume that flip-flops 50 and 51 are both in the "0" state, i.e. $\overline{A}$ and $\overline{B}$ are at ground, and A and B are both at a negative voltage. When an input pulse is applied to the complementary "c" input of flip-flop 50, flip-flop 50 changes state in the manner previously described. When flip-flop 50 changes states the voltage at A drops to negative while the voltage at A rises to ground. These changes in voltage are coupled through capacitors 68 and 69, respectively, to the anodes of diodes 64, 65, 66 and 67. If, at this time, a high negative voltage is applied to line 14 and a ground to line 15, diodes 64 and 65 will be back biased. Since the positive voltage "spike" across capacitor 69 will have an absolute magnitude less than that of the negative bias voltage on line 14, the change in voltage on line A of flip-flop 50 in the first stage will not be coupled to second stage flip-flop 51. Furthermore, since the "spike" across capacitor 68 is negative and back biases diodes 66 and 67, the change in voltage to negative on line $\overline{A}$ is prevented from reaching flip-flop 51 by those diodes 66 and 67. Flip-flop 52 will also be unaffected since it derives its input from the output of flip-flop 51 which, as has been shown, remains in the "0" state. It should be noted that the circuit that couples flip-flops 51 and 52 is identical in construction and operation to the circuit that couples flip-flops 50 and 51. Therefore, in response to a first input pulse F and the application of negative and ground voltages from timing pulse generator 1 to lines 14 and 15, respectively, the reversible counter 7 is advanced from 000 to 001, the count being taken from "0" outputs $\overline{A}$, $\overline{B}$, and $\overline{C}$.

If the voltages on lines 14 and 15 are again the same as above, at the next input pulse F, flip-flop 50 will be switched back to its "0" state with A at "1" and $\overline{A}$ at "0." A positive voltage spike will be developed across capacitor 68. This spike will be "steered" through diode 66 to the base of conducting transistor 72 to cause flip-flop 51 to change state. However, when flip-flop 51 changes from the "0" to the "1" state, while a negative voltage is on line 14, no input pulse can be coupled from the output of flip-flop 51 to flip-flop 52 for the reasons pointed out above. The counter will therefore be storing a count of 010 after the application of the second input pulse to the counter input. In a similar manner the third input pulse will step the counter to 011.

If it is desired to count in a reverse direction, the voltages on lines 14 and 15 are interchanged, i.e., the voltage on line 15 is brought to a negative value and the voltage on line 14 to ground. Again assuming that all three stages are in the "0" condition, a positive input pulse will set flip-flop 50 to its "1" state. The drop in voltage at the "0" output "$\overline{A}$" of flip-flop 50 applies a negative voltage "spike" via capacitor 68 to the anode of diodes 66 and 67, while the rise in voltage at the "1" output A applies a positive "spike" through capacitor 69 to the anodes of diodes 64 and 65. The negative "spike" is, of course, blocked by diodes 66 and 67. However, since the voltage on the base of transistor 72 is negative and the voltage on line 14 is at ground, for this example, diode 64 is forward biased to pass a positive voltage spike to the base of transistor 72, thereby switching flip-flop 72 to its "1" state. Since the voltage at the base of transistor 73 is positive when flip-flop 51 is in the "0" state, diode 65 is back biased preventing this positive spike from being applied to the "0" input (the base of transistor 73) of flip-flop 51. In an identical manner when flip-flop 51 switches from its "0" to its "1" state, a positive pulse is applied through diode 74 to flip bistable 52 to its "1" state. Therefore, when a negative voltage is present on line 15 and a ground voltage is present on line 14, the application of a pulse to the counter input will cause the counter to count in reverse from 000 to 111. The next input pulse will change the state of flip-flop 50 from "1" to "0," but the positive "spikes" thus appearing at the anodes of diodes 66 and 67 will be blocked by the high negative voltage on line 71. The count stored in the counter after two input pulses have been applied with line 70 at ground is 110. In a similar manner successive input pulses will cause the counter to continue to count in a reverse direction.

Thus, an important feature of this invention is the new and improved reversible counter 7, which can be made to count in either direction in the manner described. Variations may be made in the reversible counter and in the synchronizing system without departing from the spirit and scope of the invention as defined in the appended claims.

What is claimed is:

1. A system for synchronizing an incoming binary information signal with a local timing signal, said system comprising means for generating clock pulses, first counter means, means for feeding said clock pulses to said first counter means to cause said first counter to generate said timing signals upon the receipt of a predetermined number of said clock pulses, reversible counter means having control means for causing said reversible counter means to count in either a forward or a reverse direction, means for generating transition pulses whenever the said binary information signals change from one selected state to the other, input means for coupling said transition pulses to the input of said reversible counter means, means for coupling the timing signals to said control means to operate the said reversible counter means to count in a forward direction when the timing signals are late with respect to the information signals and in a reverse direction when the timing signals are early with respect to the information signals, first gating means connected to said reversible counter means for recognizing a predetermined forward count in said reversible counter, means connected to and responsive to said first gating means and connected to said clock pulse feeding means for increasing the rate at which said clock pulses are fed to said first counter means, second gating means connected to said reversible counter means for recognizing a predetermined reverse count in said reversible counter, and means connected to and responsive to said second gating means and connecting to said clock pulse feeding means for decreasing the rate at which said clock pulses are applied to said first counter.

2. The system as claimed in claim 1, wherein there is further provided reset means connected to said first and second gating means for resetting said reversible counter means to its initial state whenever said first or second gating means recognizes said predetermined counts and acts to vary the rate of feed of the clock pulses.

3. A system for synchronizing a binary information signal with a two-state timing signal, said system comprising first means for generating primary clock signals, second means for generating auxiliary clock signals that are out of phase with said primary clock signals, a counter means, first gating circuit means including a normally de-energized inhibiting input for delivering said auxiliary clock signals to said counter means, said counter means being operative upon the receipt of a predetermined number of said clock signals to generate said two-state timing signals, means responsive to said binary information signals for generating transition pulses whenever said information signals change state in a predetermined direction, reversible counter means for counting said transition pulses, means connected to said counter means and responsive to the concurrence of one state of said first timing signal and one of said transition pulses for causing said reversible counter means to count in a forward direction, means connected to said counter means and responsive to the concurrence of said one state of said timing signal complement and one of said transition pulses for causing said reversible counter means to count in the reverse direction, output means connected to each stage of said reversible counter means, a second gating circuit energized from said output means of said reversible counter and from said clock signal generating means, and an output line connected from said second gating circuit to said first counter means and operative upon a "forward" count to pass at least one of said primary clock signals to said counter means, so that said one of said primary clock signals will be counter as one of said predetermined number, a third gating circuit including inputs connected to said output means and means coupling the output of said third gating circuit to the inhibiting input of said first gating circuit whereby said first gating circuit is closed upon the occurrence of a predetermined "reverse" count in said reversible counter means to prevent the passage of one of said second clock signals to said counter means so that said first counter means is not advance by said one of said second clock signals.

4. The system as claimed in claim 3 including reset means connected to and responsive to the energization of either said second or said third gating circuitry for resetting said reversible counter means to its initial condition.

References Cited by the Examiner

UNITED STATES PATENTS

| | | | |
|---|---|---|---|
| 2,714,705 | 8/55 | Volz | 328—155 |
| 2,735,005 | 2/56 | Steele | 328—44 |
| 2,790,162 | 4/57 | McCormack | 340—268 |
| 2,815,503 | 12/57 | Amos | 340—268 |
| 2,841,705 | 7/58 | Moerman | 328—44 |
| 2,843,669 | 7/58 | Six et al. | 178—69.5 |
| 2,934,604 | 4/60 | Bizert | 340—147 |
| 2,968,003 | 6/61 | Apgar | 328—44 |
| 3,045,063 | 7/62 | Von Sanden | 178—70 |

NEIL C. READ, *Primary Examiner.*

STEPHEN W. CAPELLI, *Examiner.*